United States Patent [19]

Griffin

[11] Patent Number: 4,820,050
[45] Date of Patent: Apr. 11, 1989

[54] SOLID-STATE OPTICAL POSITION DETERMINING APPARATUS

[75] Inventor: James L. Griffin, Carpentersville, Ill.

[73] Assignee: Wells-Gardner Electronics Corporation, Chicago, Ill.

[21] Appl. No.: 43,503

[22] Filed: Apr. 28, 1987

[51] Int. Cl.[4] .................. G01B 11/00; G01B 11/03
[52] U.S. Cl. ............................ 356/375; 178/18;
250/221; 341/13; 341/31
[58] Field of Search ............... 356/375; 250/221, 236;
178/18; 340/365 P

[56] References Cited

U.S. PATENT DOCUMENTS

| 4,507,557 | 3/1985 | Tsikos | 356/221 |
| 4,553,842 | 11/1985 | Griffin | 356/375 |
| 4,558,313 | 12/1985 | Garwin et al. | 340/365 P |

FOREIGN PATENT DOCUMENTS 0121840 10/1984 European Pat. Off. .
2166831 5/1986 United Kingdom .

Primary Examiner—F. L. Evans
Attorney, Agent, or Firm—McDermott, Will & Emery

[57] ABSTRACT

An optical position determining apparatus for detecting radiant energy reflected from a target zone includes an emission device for generation and emission of radiant energy, a device for redirecting radiant energy across the target zone, a reflecting device for reflecting the radiant energy back from the target zone, and a detector device for sensing the presence of radiant energy reflected from the target zone. The emission device is stationary and emits a beam of radiant energy toward the redirecting device, which redirects the radiant energy along a primary beam path. The redirecting device also is configured for permitting a return beam of light from the target zone to impinge upon the detector device, which is located therebehind with respect to the direction of travel of the return beam. The detector device includes a CCD (charge coupled device) linear sensor formed of a plurality of sensor elements. The sensor elements are pulsed in successive order for scanning the target zone for the presence of the reflected radiant energy and for producing an electrical signal in response to the presence of such reflected radiant energy.

19 Claims, 4 Drawing Sheets

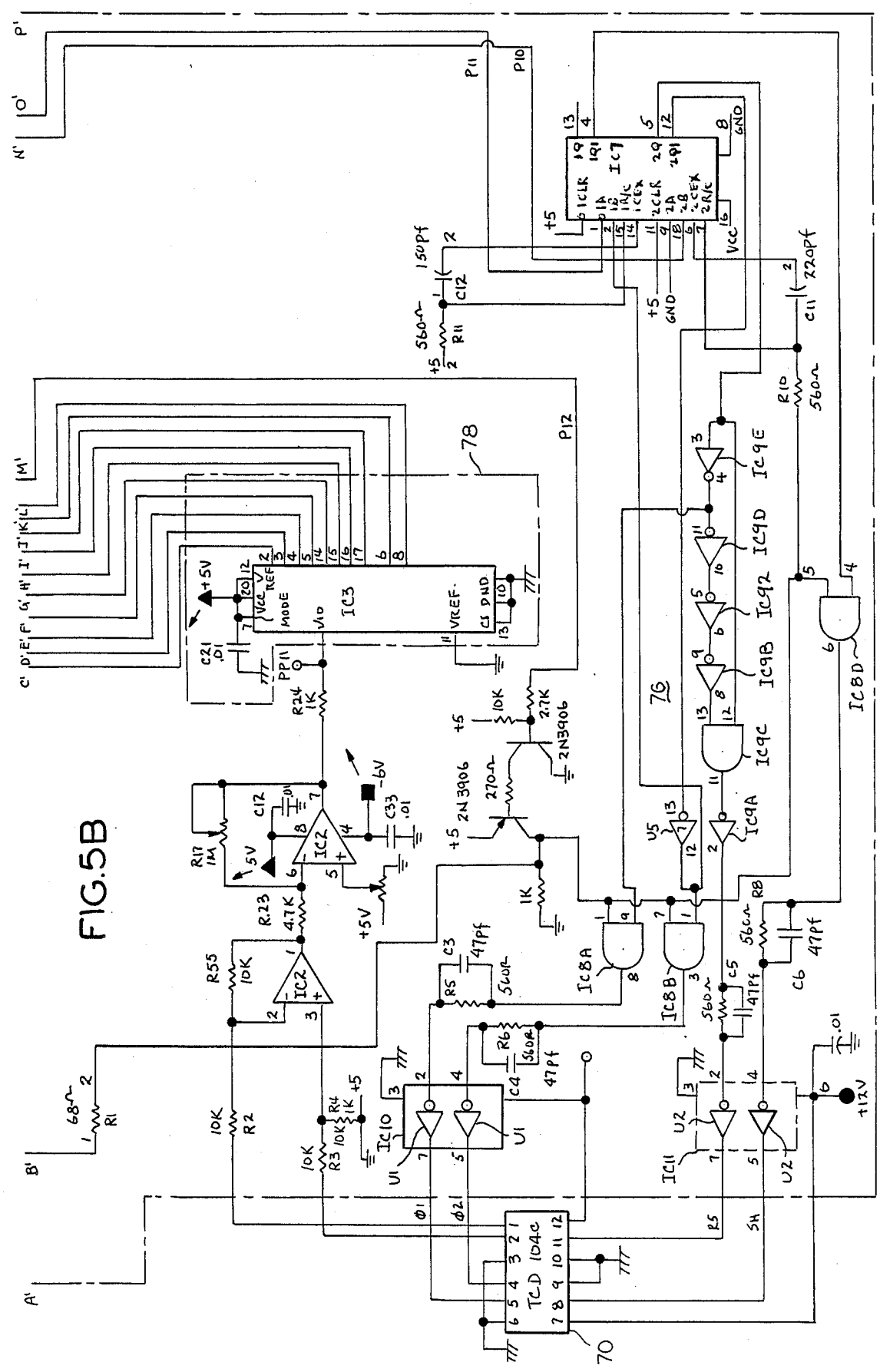

SOLID-STATE OPTICAL POSITION DETERMINING APPARATUS

BACKGROUND OF THE INVENTION

This invention relates generally to optical position location apparatuses for locating the position of an object along one or more coordinate axes and more specifically, it relates to a solid-state optical position determining apparatus for achieving such location.

Heretofore, there are known in the prior art several optical touch screen input apparatuses which have optically, or through a combination of mechanical and optical devices, been capable of determining the location of an object within a two dimensional target field. In particular, examples of such optical touch screen input devices are disclosed in U.S. Pat. No. 4,267,443 issued on May 12, 1981 to Carroll et al, and U.S. Pat. No. 4,420,261 issued on Dec. 13, 1983, to Barlow et al.

Further, there is disclosed in U.S. Pat. No. 4,553,842 entitled "Optical Position Determining Apparatus," which was issued on Nov. 19, 1985, and is assigned to the same assignee as this application, an optical position location apparatus for locating an object in two dimensions which includes a housing defining a target zone. The location of objects is to be determined within the target zone by detection of interruption of light paths dispersed across such target zone. In one corner of the housing, there are provided a light directing means, a mechanical scanner-detector assembly, and a light source. The scanner-detector assembly consists of a drive motor for rotating a detector housing containing a photo-detector. By rotating the detector housing with its associated aperture and lens, the photo-detector scans the target zone for the presence of returning light and produces an electrical signal in response to the presence of such light. However, this prior art location apparatus has the undesirable aspect of being susceptible to mechanical vibrations due to its use of a rotating detector housing, thereby affecting its reliability and accuracy in use. Further, this location apparatus suffers from the disadvantage of requiring large and heavy-weight components occupying relatively large areas of space which increases cost in its manufacture and assembly.

It would therefore be desirable to provide an optical position determining apparatus which is formed completely of solid-state components and has a high degree of resistance to vibrations. The solid-state optical positioning determining apparatus of the present invention is, by its very design, efficient, low-cost, and reliable in nature. The present invention represents an improvement over U.S. Pat. No. 4,553,842, which is hereby incorporated by reference.

SUMMARY OF THE INVENTION

Accordingly, it is a general object of the present invention to provide an improved optical position determining apparatus which is relatively simple and economical to manufacture and assemble, but yet overcomes the disadvantages of the prior art location apparatuses.

It is an object of the present invention to provide an optical position determining apparatus which is formed completely of solid-state components and has a high degree of resistance to vibrations.

It is another object of the present invention to provide an efficient, low-cost and accurate optical position determining apparatus requiring a minimal number of components, which is substantially compact and light-weight.

It is still another object of the present invention to provide an optical position determining apparatus which includes a detector device formed of a CCD linear image sensor having a plurality of sensor elements.

It is yet still another object of the present invention to provide an optical position determining apparatus which includes a CCD linear image sensor for producing an electrical signal in response to the presence of reflected radiant energy and a microprocessor responsive to the electrical signal for calculating the vertical and horizontal coordinates of an obstruction located within the target zone.

It is yet still another object of the present invention to provide an optical position determining apparatus which includes a light-redirecting device formed of a split mirror having a first portion and a second portion spaced apart from the first portion and forming a gap therebetween.

It is yet still a further object of the present invention to provide an optical position determining apparatus which includes a light-redirecting device formed of a single-piece mirror.

In accordance with these aims and objectives, the present invention is concerned with the provision of an optical position determining apparatus for detecting radiant energy reflected from a target zone which includes an emission device for generation and emission of radiant energy, a light-redirecting device for redirecting the radiant energy across the target zone, a reflecting device for reflecting the radiant energy back from the target zone, and a detector device for sensing the presence of radiant energy reflected from the target zone. The emission device is stationary and emits a beam of radiant energy toward the redirecting device, which directs the radiant energy along a primary beam path. The redirecting device also is configured for permitting a return beam of light from the target zone to impinge upon the detector device, which is located therebehind with respect to the direction of travel of the return beam. The detector device includes a CCD (charge coupled device) linear image sensor formed of a plurality of sensor elements. The sensor elements are pulsed in successive order for scanning the target zone for the presence of the reflected radiant energy and for producing an electrical signal in response to the presence of such reflected radiant energy In another aspect of the present invention, the light-redirecting device includes a split mirror formed of a first portion and a second portion spaced apart from the first portion and forming a gap therebetween. Each of the first and second portions has a substantially flat reflective surface facing away from the detector device. The gap extends through the reflective surfaces and is substantially centered with respect to the detector device and the primary beam path.

In still another aspect of the present invention, the light-redirecting device may alternately be formed of a single-piece mirror rather than using the split mirror structure.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIGS. 5A and 5B, when connected together, is a detailed schematic circuit diagram showing circuitry suitable for use in certain of the blocks of FIG. 4.

DESCRIPTION OF THE PREFERRED EMBODIMENT

Figure 1:
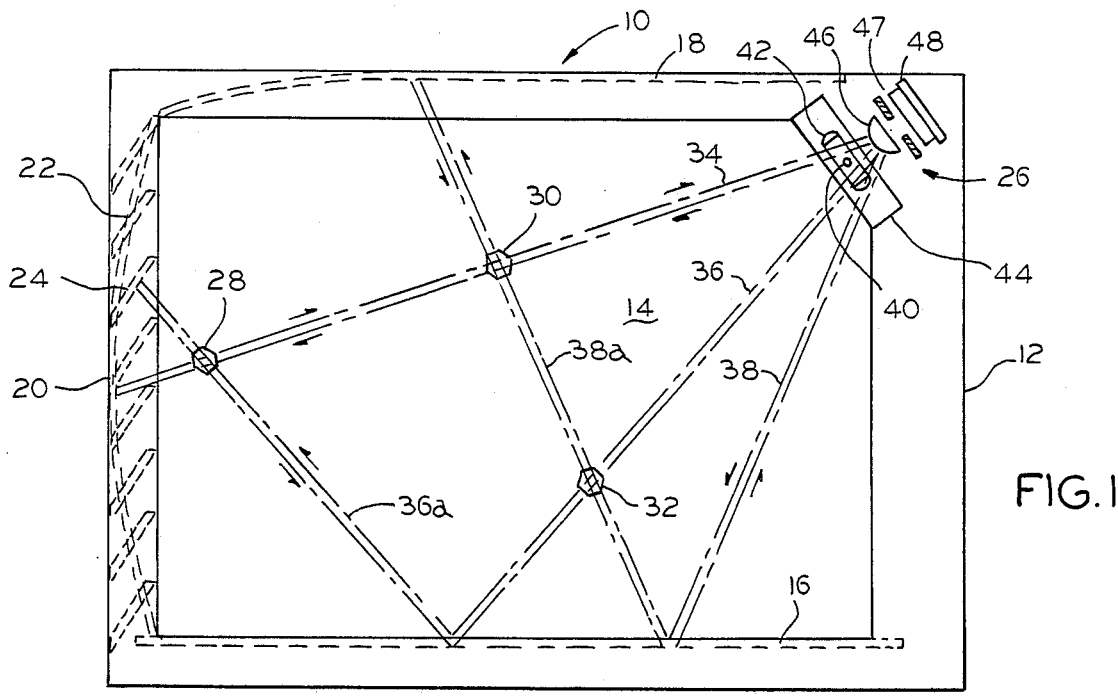
FIG. 1 is a front plan view of a solid-state optical position determining apparatus constructed in accordance with the principles of the present invention.

Referring now in detail to the various view of the drawings, there is shown in FIG. 1 a solid-state optical position determining apparatus 10 of the present invention for detecting the presence and position of an object or obstruction such as a finger and the like relative to a surface, and in particular, relative to the surface of a touch screen input device of a computer terminal. Generally, the touch screen input device takes on the form of an overlay for creating a light curtain in front of a cathode ray tube or other display screen, such that penetration of the light curtain is detectable by the apparatus 10. Furthermore, the penetration of the light curtain by the finger and the like is interpreted to fix its location relative to the screen for a particular application, such as for selection or indicating an item displayed on the touch screen.

The solid-state optical positioning determining apparatus 10 includes a substantially rectangular-shaped housing 12 which serves to maintain the various elements thereof in their proper relative positions and is used to define a target zone 14 within which the location of objects is to be determined. There are arranged within the housing 12 about the target zone 14 a flat reflector such as a mirror 16, a retroreflector 18, and a retroreflector assembly 20. The retroreflector assembly 20 consists of a retroreflector strip 22 and a plurality of retroreflector elements 24 arranged in echelon adjacent to the retroreflector strip 22. In one corner of the housing 12, there is provided a solid-state optical transmitter/receiver module 26 which will be described in greater detail hereinafter.

Briefly, in the operation of the solid-state optical position determining apparatus 10 of the present invention, the relative locations of objects or obstructions 28, 30 and 32 along the coordinate axes within the target zone 14 may be determined by a conventional triangulation method as is well known in the art. To this end, the respective beams of light 34, 36 and 38 are emitted from the optical transmitter/receiver module 26. As can be seen, the light beam 34 intersects directly both obstructions 28 and 30 and the light beam 36 intersects directly the obstruction 32. On the other hand, the light beam 38 initially strikes the mirror 16 and is thereafter reflected by the mirror as light beam 38a, at an angle equal and opposite its angle of incidence, to intersect both obstructions 32 and 30. Similarly, the light beam 36 initially strikes the mirror 16 and is also thereafter reflected by the mirror as light beam 36a to intersect the obstruction 28.

As a result, it can thus be seen that each of the objects or obstructions is intersected by two separate beams of light emitted from the optical transmitter/receiver module 26 at two different angles. The first angle produced by the light beam striking directly the obstruction is referred to as the primary angle, and the second angle produced by the reflected light beam striking the obstruction after initially striking the mirror and then reflected is referred to as a secondary angle. Hence, by determining the primary and secondary angles caused by each of the intersecting light beams the coordinates of the obstruction can be readily calculated using the triangulation method. It will be appreciated that a retroreflector such as the retro-reflectors 18 and 20 reflect a beam of light directly upon itself along the path of incidence of the light received. This phenomena is indicated by the bidirectional arrows depicted adjacent the light beams 34, 36a, 38 and 38a. Therefore, a detector means formed within the optical transmitter/receiver module detects each of the obstructions 28, 30 and 32 along the paths of at least two separate ones of the light beams 34, 36 and 38. The detector means determines the location of the objects by the presence or absence of the return beam of light on each of the paths along which the light beam is directed.

Figure 2:
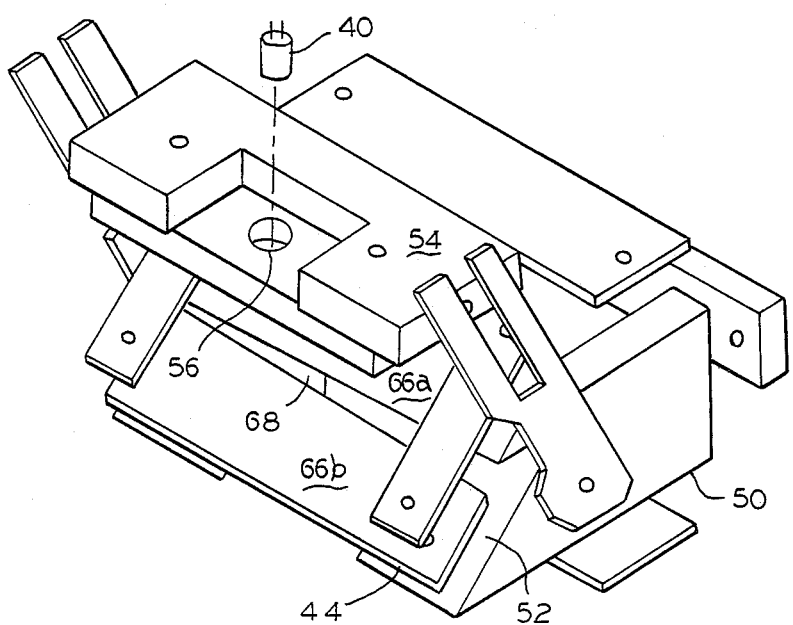
FIG. 2 is a perspective view of the optical transmitter/detector module for use in the optical position determining apparatus of the present invention.
Figure 3B:
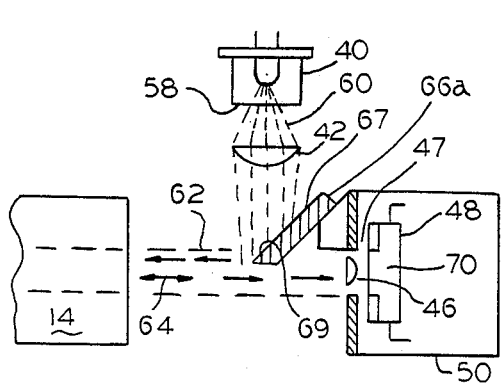
FIG. 3B is a side elevational view of an alternate embodiment of the optical module of FIG. 3A.
Figure 3A:
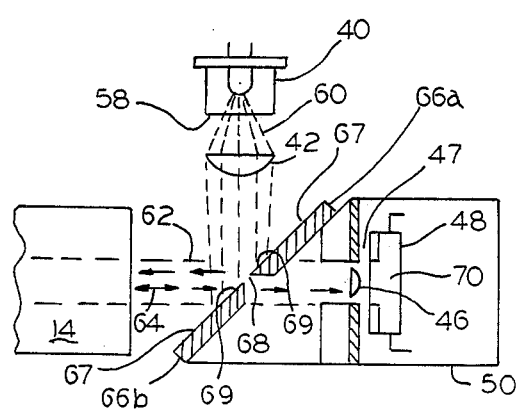
FIG. 3A is a side elevational view, somewhat schematic in form, of the optical module, taken along the lines 3—3 of FIG. 2.

Referring now to FIGS. 2 and 3A of the drawings, there is shown a perspective view of the specially-designed optical transmitter/receiver module 26 which houses a stationary light emission means 40, a transmitter or concentrator lens 42, light-redirecting means 44, a receiver lens 46, and a detector means 48. The module 26 includes a main body portion 50 which has mounted thereon the receiver lens 46 and the detector means 48. The front section of the body portion 50 has an angularly-disposed surface 52 for mounting of the light-redirecting means 44. The module 26 also includes a flat plate member 54 having an aperture 56 formed therein for holding the light-emission means 40 and the transmitter lens 42 above the light-redirecting means 44.

As can best be seen from FIG. 3A, the light emission means 40 is used to introduce radiant energy or light into the module 26 to be distributed to the target zone 14. While the emission means 40 may consist of an incandescent bulb, in the preferred embodiment of the invention it comprises a light-emitting diode (LED). Alternatively, the emission means may be formed of a laser diode if desired. The beams of light from the LED 40 are preferably first received by a front portion 58 formed integrally with the LED, which light beams are indicated by the generally diverging lines 60 emanating therefrom The transmitter lens 42 is also sometimes referred to as a concentrator lens and serves to focus the light beams 60 to a predetermined area on the light-redirecting means 44, which will be discussed in detail hereinbelow. The light-redirecting means 44 redirects the beams of light as indicated at reference numeral 62 in a first direction along a primary beam path 64, generally in a converging fashion toward the target zone 14. Accordingly, in view of the action of the retroreflectors 18 and 20, the return beam will be substantially along the same line 62. The receiver lens 46 is of a special design and has approximately a 3 mm focal length. The receiver lens is used to focus the return beams so as to cause them to converge in a second direction opposite to the first direction along the primary beam path 64 in the direction of the detector means 48. It will be noted that the detector means 48 is located behind the receiver lens 46 and an opening 47 in alignment with the primary beam path 64.

In accordance with a preferred form of the invention, the light redirecting means comprises a split mirror 44 formed of a substantially flat first or top portion 66a and substantially flat second or bottom portion 66b spaced apart from the first portion and forming a gap or opening 68 therebetween. Each of the first and second mirror portions has a substantially flat reflective surface 67 which is disposed at a 45° angle so as to redirect the beam from the emission means 40 along the primary beam path 64 substantially at a right angle. It will be noted that the opening 68 between the first and second portions of the split mirror diverges from the left end thereof to the right end thereof (FIG. 2). These mirror portions 66a and 66b are positioned advantageously so as to selectively control the intensity of the return light beams received on various portions of the detector means 48. This gap 68 has a relatively narrow dimension in one plane for thereby maximizing the depth of field of focus to be achieved by the receiver lens 46 and a considerably greater dimension in the other plane to optimize or maximize the net radiant energy permitted to pass therethrough.

In accordance with an alternate preferred form of the invention shown in FIG. 3B, the light-redirecting means comprises a single-piece mirror formed of only the substantially flat top portion 66a of FIG. 3A. In other words, the bottom portion 66b of the split mirror 44 is omitted. Except for this structural difference, the optical transmitter/receiver modules of FIGS. 3A and 3B are constructed and operate in an identical manner.

As best viewed in FIG. 3A, it can be seen that the mirror portion 66a and 66b are disposed for substantially centering the opening 68 so as to be perpendicular to the center of curvature of the inside radius of the transmitter lens 42 and the receiver lens 46. In other words, the two center lines of the transmitter lens and the receiver lens must intersect at the plane of the surface of the split mirror. Further, the edges of the mirror portion 66a and 66b adjacent the opening 68 are chamfered at approximately 50° so as to reduce the amount of light transmitted from the LED 40 that can be passed directly through the mirror portions. Also, this reduces inadvertent stray reflected beams from the target zone 14 from being received by the detector means 48, thereby causing an erroneous effect on the operation of the apparatus.

Most advantageously, the transmitter lens 42 is selected and positioned to cause convergence of the emitted beams from the LED 40 upon the split mirror 44 in an area 69 immediately surrounding the gap 68. Therefore, the location at which the beams are detected by the detector means 48 is substantially coincident with the apparent source of these emitted beams at the surfaces of the split mirror 44. In this regard, and with reference also to FIG. 3A, it will be seen that this area 69 substantially surrounds the gap 68. Moreover, the gap 68 extends through the reflective surfaces 67 (facing away from the detector means) of the split mirror and is substantially centered with respect to the detector means 48 and the primary beam path 64.

In accordance with a further feature of the illustrated embodiment, the detector means 48 comprises preferably a CCD (charge coupled device) linear image sensor 70 which is similar to one that is commercially available from Toshiba and designated by their Part No. TCD104C. The image sensor 70 includes an array of 128 linearly arranged optical sensor elements which accepts light photons and generates electronic charge packets that are proportional to the intensity of the return beam. The image sensor 70 is located closely behind the receiver lens 46 and the opening 47, and also in direct alignment with the primary beam path. Accordingly, the return beams from the target zone 14 traveling in the second or opposite direction along the primary beam path are directed through the opening 68 between the mirror portions, the receiver lends 46, and the opening 47 to the image sensor 70.

Figure 6:
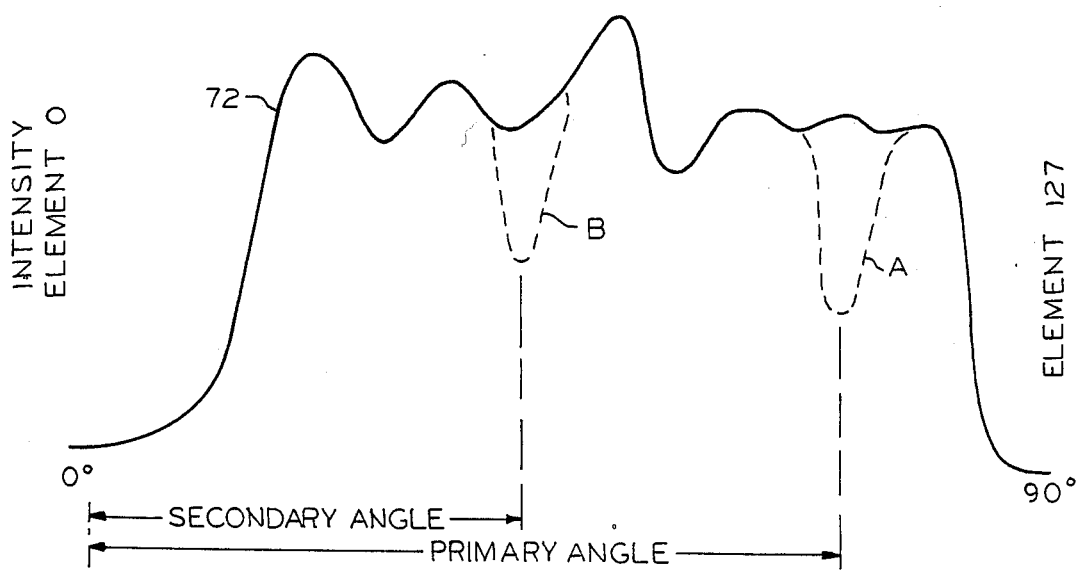
FIG. 6 is a waveform of the optical pattern appearing on the screen.

Each of the 128 optical sensor elements is pulsed in successive order at a desired rate in order to scan the target zone 14 for the presence of returning light beam and produces an electrical signal in response to the presence of such light. A waveform 72 of an electrical signal is illustrated in FIG. 6 corresponding to the optical pattern when none of the sensor elements are blocked by an obstruction (a non-touch pattern when the screen has not been touched). As can be seen, the waveform 72 illustrates the voltage level (intensity of the return beam) relative to the 128 sensor elements corresponding to 90° of the target zone 14. When one or more of the sensor elements are blocked by an obstruction (a touch pattern), the voltage levels will decrease so as to cause the appearance of two notches A and B. The first notch A is located at the primary angle and is caused by a direct light beam hitting the obstruction (such as the beam 34 striking the obstruction 28 in FIG. 1). The second notch B is located at the secondary angle and is caused by a reflected light beam hitting the obstruction (such as the beam 36a striking the obstruction 28 in FIG. 1).

Figure 4:
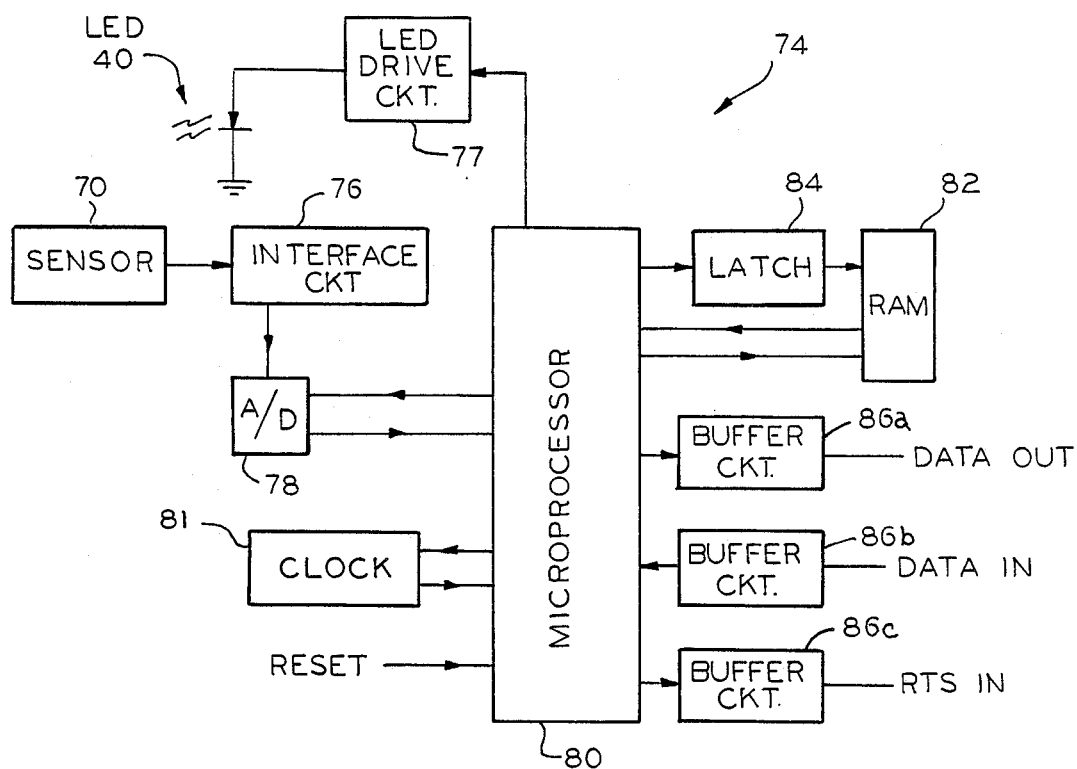
FIG. 4 is a block diagram of the electronic circuitry used in connection with the solid-state optical position determining apparatus of FIG. 1.

A block diagram of external electronic circuitry 74 for processing the electrical signal generated from the image sensor 70 to pinpoint the position of the obstructions is illustrated in FIG. 4. The electronic circuitry 74 includes a CCD interface circuit 76 which has its input connected to the output of the image sensor 70. The interface circuit 76 produces at its output the electrical signal shown in the waveform of FIG. 6 by delivering analog samples for each scan from each of the 128 sensor elements. This analog electrical signal is fed to an analog-to-digital (A/D) converter 78 which converts the same to digital signals for use by a microprocessor 80.

Before the touch screen is activated (no obstruction is touching the screen), each of the 128 sensor elements is initially scanned to produce the electrical signal or waveform 72 of FIG. 6. This signal is amplified by the interface circuit 76, digitized by the A/D converter 78, and shifted into a random-access memory (RAM) 82 for storage for future reference via a latch circuit 84 under the control of the microprocessor 80. When the digitized data is retrieved from the RAM 82 and compared with corresponding samples from subsequent scans, any difference between the initial scan and other later scans will indicate an obstruction of some of the sensor elements by the appearance of two notches in the waveform 72. (For example, the notches A and B in FIG. 6.) These notches are indicative of angular displacement from a reference of an obstruction located within the target zone. By using the location of these two notches (primary and secondary angles), the microprocessor 80 utilizes a stored program for calculating the horizontal and vertical coordinates on the screen where the obstruction is occurring by the triangulation technique and transmits this information to a host computer (not shown) via input/output buffer circuits 86a, 86b, and 86c.

Figure 5A:
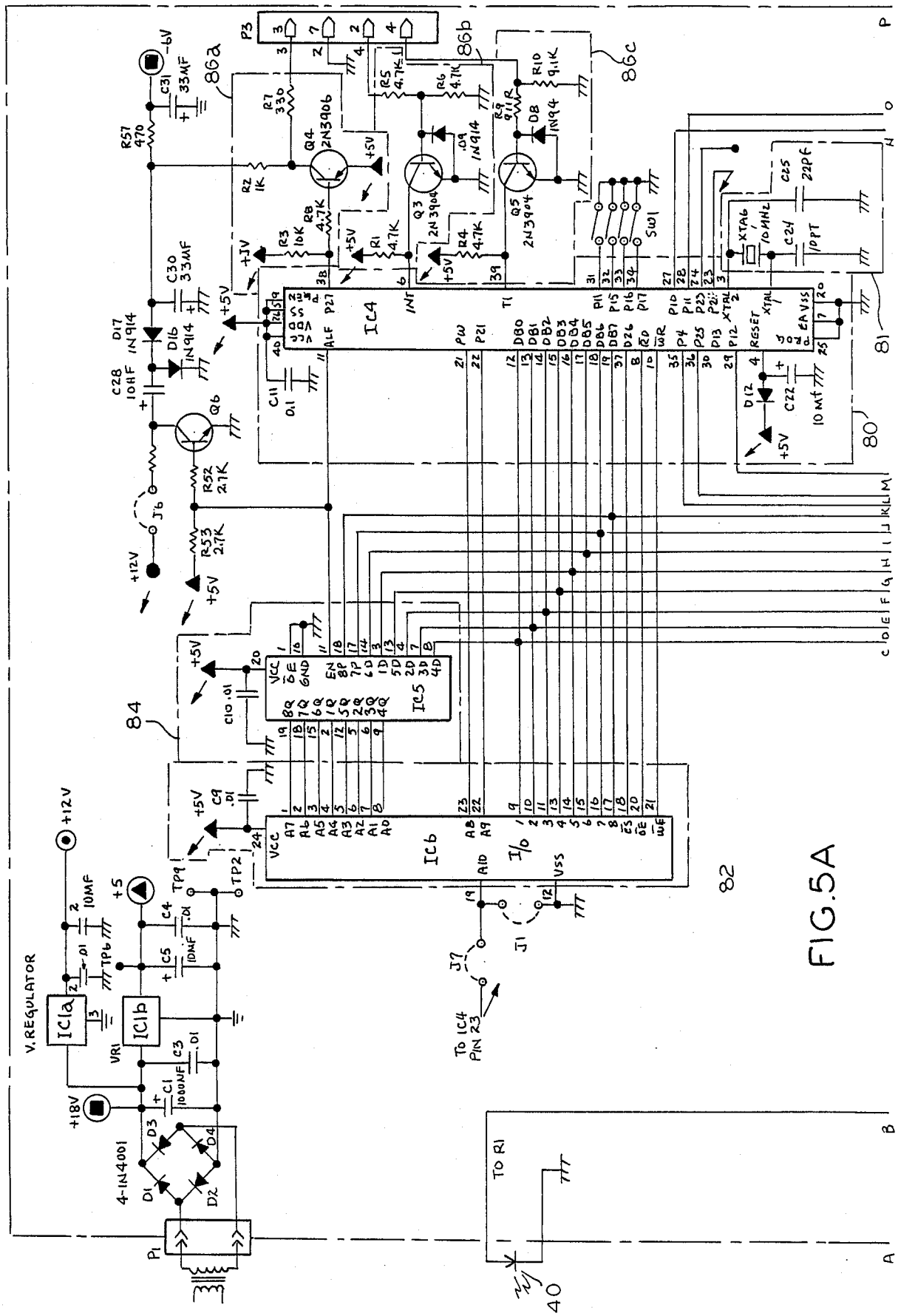

While the various blocks of the interface circuit 76, LED driver circuit 77, A/D converter 78, microprocessor 80, clock 81, RAM 82, latch circuit 84, and input/output buffer circuits 86a-86c may take on various forms, suitable circuitry therefore is illustrated in FIGS. 5A and 5B when connected together. This detailed schematic circuit diagram is believed to be self-explanatory to those skilled in the art in view of the foregoing description and thus a detailed discussion of the operation of each block is believed to be unnecessary.

For completeness in the disclosure of the present invention, but not for purposes of limitation, the following component identifications of the integrated circuits are submitted for FIGS. 5A and 5B. Those skilled in this art will recognize that alternative components and values to those illustrated and described may be employed in constructing the circuit in accordance with the present invention.

| PART | TYPE |
| --- | --- |
| IC1a | Regulator, 78L12 |
| IC1b | Regulator, 7805 |
| IC2 | Op Amp, TL082 |
| IC3 | A/D Converter, ADC0820 |
| IC4 | up, P8749H |
| IC5 | Latch, 74LS373 |
| IC6 | RAM, HM6116P4 |
| IC7 | One-shot, 74LS123 |
| IC8A-8D | AND gate, 74LS08 |
| IC9A-9E | Inverter, 74LS04 |
| IC10,IC11 | Clock Driver, DS0026CN |

From the foregoing detailed description, it can thus be seen that the present invention provides an optical position determining apparatus which is formed totally of solid-state components and has a high degree of resistance to vibrations. The optical positioning determining apparatus includes a detector device formed of a CCD linear image sensor having a plurality of sensor elements. The sensor elements are pulsed in successive order for scanning the target zone for the presence of the reflected radiant energy and for producing an electrical signal in response to the presence of such reflected radiant energy. Further, there is provided an improved light-redirecting device formed of a split mirror having a substantially flat first portion and a substantially flat second portion spaced apart from the first portion and forming a gap therebetween.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An optical position determining apparatus for detecting radiant energy reflected from a target zone comprising:
   emission means for generating and for emitting of radiant energy;
   means for redirecting the radiant energy across the target zone;
   means for reflecting the radiant energy back from the target zone;
   detector means for sensing the presence of radiant energy;
   said emission means being stationary and emitting a beam of radiant energy toward said redirecting means to be directed therefrom along a primary beam path in a first direction to the target zone;
   said detector means being located along said primary beam path for detecting the radiant energy reflected from the target zone back along the primary beam path in a second direction substantially opposite to said first direction;
   said redirecting means being configured for permitting at least a portion of an incident beam traveling in said second direction along said primary beam path to pass therethrough for detection by said detector means;
   said detector means including a CCD (charge coupled device) linear image sensor formed of a plurality of sensor elements, said sensor elements being pulsed in successive order for scanning the target zone for the presence of the reflected radiant energy and for producing an electrical signal which is proportional to the intensity of the radiant energy reflected from the target zone in response to the presence of such reflected radiant energy; and electronic processing circuit means connected to said linear image sensor for processing of said electrical signal, said electronic processing circuit means including interface circuit means for indicating angular displacements from a reference so that when an obstruction is located within the target zone a first notch having a secondary angle and a second notch having a primary angle will appear in said electrical signal.

2. An optical position determining apparatus as claimed in claim 1, wherein said electronic processing circuit means further includes microprocessor means for calculating the vertical and horizontal coordinates of the obstruction based upon said primary and secondary angles.

3. An optical position determining apparatus as claimed in claim 1, wherein said redirecting means comprises a split mirror formed of a first portion and a second portion spaced apart from the first portion and forming a gap therebetween, each of said first and second portions having a substantially flat reflective surface facing away from said linear image sensor, said gap extending through said reflective surfaces and being substantially centered with respect to said linear image sensor and said primary beam path.

4. An optical position determining apparatus as claimed in claim 3, wherein said gap between said first and second mirror portions diverge from one end thereof to the other end thereof.

5. An optical position determining apparatus as claimed in claim 4, wherein said mirror portions have edges adjacent the opening which are chamfered at approximately 50° so as to reduce the amount of light transmitted from the emission means that can be passed directly through the mirror portions.

6. An optical position determining apparatus as claimed in claim 3, further comprising a transmitter lens interposed between said emission means and said split mirror for focusing the beam of radiant energy produced by said emission means upon an area of said mirror portions substantially surrounding said gap therein.

7. An optical position determining apparatus as claimed in claim 6, further comprising a receiver lens interposed between said split mirror and said linear image sensor for focusing of the reflected radiant energy from said target zone received through said gap upon said linear image sensor.

8. An optical position determining apparatus as claimed in claim 3, wherein said reflective surfaces of said first and second mirror portions are disposed for redirecting the beam of radiant energy from said emission means substantially at a right angle, said emission means being located above said primary beam path.

9. An optical position determining apparatus as claimed in claim 1, wherein said emission means comprises a light-emitting diode.

10. An optical position determining apparatus as claimed in claim 1, wherein said redirecting means comprises a single-piece mirror.

11. An optical position determining apparatus for detecting radiant energy reflected from a target zone comprising:
    emission means for generating and for emitting of radiant energy;
    means for redirecting the radiant energy across the target zone;
    means for reflecting the radiant energy back from the target zone;
    detector means for sensing the presence of radiant energy and for producing an electrical signal in response thereto;
    said emission means being stationary and emitting a beam of radiant energy toward said redirecting means to be directed therefrom along a primary beam path in a first direction to the target zone;
    said detector means being located along said primary beam path for detecting the radiant energy reflected from the target zone back along the primary beam path in a second direction substantially opposite to said first direction;
    said redirecting means being configured for permitting at least a portion of an incident beam traveling in said second direction along said primary beam path to pass therethrough for detection by said detector means; and
    said redirecting means including a split mirror formed of a first portion and a second portion spaced apart from the first portion and forming a gap therebetween, each of said first and second portions having a substantially flat relative surface facing away from said detector means, said gap extending through said reflective surfaces and being substantially centered with respect to said detector means and said primary beam path.

12. An optical position determining apparatus as claimed in claim 11, wherein said gap between said first and second mirror portions diverge from one end thereof to the other end thereof.

13. An optical position determining apparatus as claimed in claim 12, wherein said mirror portions have edges adjacent the opening which are chamfered at approximately 50° so as to reduce the amount of light transmitted from the emission means that can be passed directly through the mirror portions.

14. An optical position determining apparatus as claimed in claim 11, wherein said reflective surfaces of said first and second mirror portions are disposed for redirecting the beam of radiant energy from said emission means substantially at a right angle, said emission means being located above said primary beam path.

15. An optical position determining apparatus as claimed in claim 11, further comprising electronic processing circuit means connected to said detector means for processing of said electrical signal, said electronic processing circuit means including interface circuit means for indicating angular displacements from a reference so that when an obstruction is located within the target zone a first notch having a secondary angle and a second notch having a primary angle will appear in said electrical signal.

16. An optical position determining apparatus as claimed in claim 15, wherein said electronic processing circuit means further includes microprocessor means for calculating the vertical and horizontal coordinates of the obstruction based upon said primary and secondary angles.

17. An optical position determining apparatus for detecting radiant energy reflected from a target zone comprising:
    emission means for generating and for emitting of radiant energy;
    means for redirecting the radiant energy across the target zone;
    means for reflecting the radiant energy back from the target zone;
    detector means for sensing the presence of radiant energy and for producing an electrical signal in response thereto;
    said emission means being stationary and emitting a beam of radiant energy toward said redirecting means to be directed therefrom along a primary beam path in a first direction to the target zone;
    said detector means being located along said primary beam path for detecting the radiant energy reflected from the target zone back along the primary beam path in a second direction substantially opposite to said first direction;
    said redirecting means including a single-piece mirror having a substantially flat reflective surface facing away from said detector means, said single-piece mirror being configured for permitting
    at least a portion of an incident beam traveling in said second direction along said primary beam path to pass through an opening adjacent to said single-piece mirror for detection by said detector means.

18. An optical position determining apparatus as claimed in claim 17, further comprising electronic processing circuit means connected to said detector means for processing of said electrical signal, said electronic processing circuit means including interface circuit means for indicating angular displacements from a reference so that when an obstruction is located within the target zone a first notch having a secondary angle and a second notch having a primary angle will appear in said electrical signal.

19. An optical position determining apparatus as claimed in claim 18, wherein said electronic processing circuit means further includes microprocessor means for calculating the vertical and horizontal coordinates of the obstruction based upon said primary and secondary angles.

* * * * *